United States Patent [19]

Kajikawa et al.

[11] Patent Number: 4,660,054
[45] Date of Patent: Apr. 21, 1987

[54] PEN CHANGER WITH ORTHOGONAL PICK UP FROM THE TURRET

[76] Inventors: Osamu Kajikawa; Shuso Matsumoto, both of c/o Mutoh Industry Ltd., 3-1-3, Ikejiri, Setagaya-ku, Tokyo, Japan

[21] Appl. No.: 742,967

[22] Filed: Jun. 10, 1985

[51] Int. Cl.⁴ .................. G01D 9/00; G01D 15/16; G01D 9/28
[52] U.S. Cl. .................. 346/139 R; 346/1.1; 346/141; 346/49
[58] Field of Search .......... 346/139 R, 29, 46, 49, 346/140 R, 141, 1.1; 400/18-20

[56] References Cited

U.S. PATENT DOCUMENTS

| | | | |
|---|---|---|---|
| 4,417,258 | 11/1983 | Tribolet | 346/139 R |
| 4,496,958 | 6/1985 | Brandt | 346/139 R |
| 4,518,972 | 5/1985 | Gunderson | 346/139 R |

*Primary Examiner*—E. A. Goldberg
*Assistant Examiner*—Mark Reinhart

[57] ABSTRACT

A method of exchanging writing implements for automatic drafting machine and its device in which a plurality of writing implement holders consisting of a stationary arm and a rotary arm at a stocker side, and a writing implement holder consisting of a stationary arm and a rotary arm is provided at a drawing head side, and when the drawing head moves to pick up a writing implement at the stocker side, a position of the stocker is shifted relatively to the drawing head so that a writing implement holding side end of the stationary arm at the drawing head side is shifted at a predetermined interval in the inside direction of an open portion of the writing implement holder at the stocker side relative to the writing implement holding side end of the stationary arm at the stocker side, and when the drawing head moves to place a writing implement at the stocker, a position of the stocker is shifted relatively to the drawing head so that the writing implement holding side end of the stationary arm at the stocker side is shifted in the inside direction of an open portion of the writing implement holder at the drawing head side at a predetermined interval relative to the writing implement holding side end of the stationary arm at the drawing head side.

2 Claims, 26 Drawing Figures

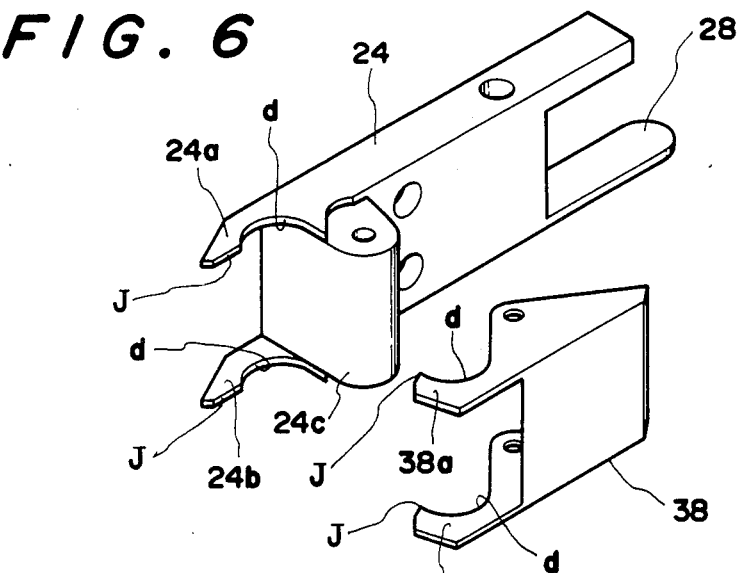

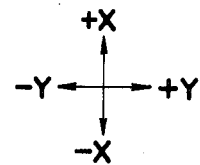
FIG. 15(a)
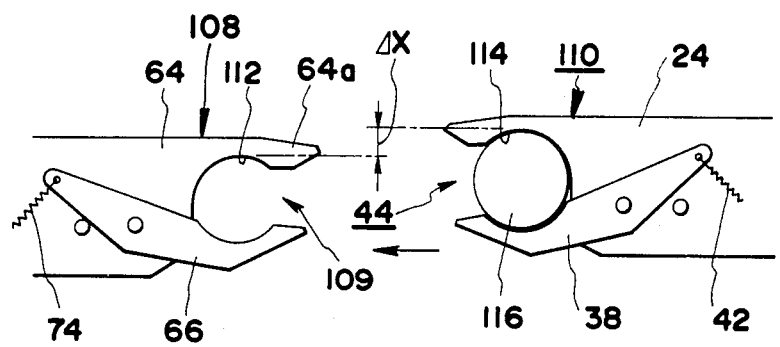
FIG. 15(b)
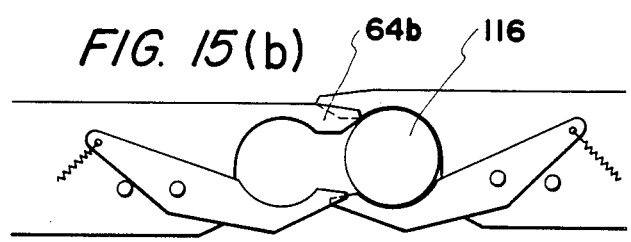
FIG. 15(c)
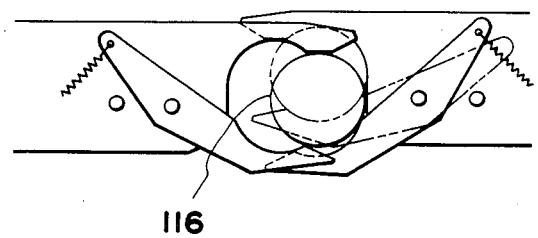

PEN CHANGER WITH ORTHOGONAL PICK UP FROM THE TURRET

BACKGROUND OF THE INVENTION

This invention relates to a method of exchanging writing implements in a drafting machine between a pen magazine holding a plurality of writing implements and a drawing head, and to an apparatus therefor.

The device disclosed in U.S. Pat. No. 4,288,798 is well known as an exchanging device for writing implements. This exchanging device is constructed in such a way that a plurality of writing implement holders consisting of two elastic clips are disposed in the pen magazine, and a single writing implement holder consisting of two elastic clips is provided in the drawing head. When the writing implements are exchanged, the elastic clips in the pen magazine and the elastic clips in the drawing head are in mutual pressure contact. The device is constructed in such a way that the elastic clips in the drawing head expand the elastic clips in the pen magazine, or the elastic clips in the pen stocker expand the elastic clips in the drawing head.

Accordingly, there is a drawback that the elastic clips constituting the writing implement holder are quickly worn out.

Also, since the device is constructed in such a way that the writing implement holder in the pen magazine and the writing implement holder in the drawing head are identically constructed, the tips of the elastic clips in the drawing head collide with the tips of the elastic clips in the pen magazine when the drawing head approaches the pen magazine for exchange of the writing implements where the writing implements are retained by both the writing implement holders in the pen magazine and the drawing head, and as a result, the elastic clips are broken which is a drawback.

An object of this invention is to eliminate the foregoing drawbacks.

SUMMARY OF THE INVENTION

In order to achieve the foregoing object, this invention is constructed in such a way that a plurality of writing implement holders are provided which consist of a stationary arm and a rotary arm urged in the direction toward the stationary arm, and a writing implement holder is provided in a drawing head which consists of the stationary arm and a rotary arm urged in the direction toward the stationary arm, and when the drawing head approaches a magazine, the writing implement holder in the drawing head is at a different level than the writing implement holders. When the open portion of each writing implement holder in the magazine and the writing implement holder in the drawing head are opposite, the stationary arm of the writing implement holder in the magazine and the stationary arm of the writing implement holder in the drawing head are mutually opposed. When the drawing head moves to pick up the writing implement retained in the magazine, the position of the writing implement holder at the magazine is caused to shift relatively to the writing implement holder in the drawing head by the end the stationary arm in the drawing head in a direction toward the inside of the portion of the writing implement holder in the magazine by a predetermined interval relative to the writing implement holder in the drawing head, and in case the writing implement holder on the drawing head is crossed with the selected writing implement holder in the magazine, the writing implement holder in the drawing head grips the writing implement in the writing implement holder in the magazine and the writing implement is separated from the stationary arm of the writing implement holder in the magazine by the pressure of the stationary arm of the writing implement holder in the drawing head. In case the drawing head moves to place the writing implement in an empty writing implement holder in the magazine, the writing implement holding end of the stationary arm in the drawing head is shifted in the inside direction of the open portion of the writing implement holder in the drawing a predetermined interval relative to the writing implement holding end of the stationary arm in the drawing head, and the position of the writing implement holder in the magazine is shifted relatively to the writing implement holder in the drawing head, and in case the writing implement holder in the drawing head is crossed with the empty writing implement holder in the selected magazine, the empty writing implement holder in the magazine grips the writing implement in the writing implement holder in the drawing head, and the writing implement is separated from the stationary arm of the writing implement holder in the drawing head.

DESCRIPTION OF THE FIGURES

FIG. 6 is an exploded view of the writing implement holder in the drawing head.

FIG. 7 is a cross sectional view of a magazine.

FIGS. 15a–15c are explanatory views for showing the operation when the drawing head moves to place the writing implement in the magazine.

DESCRIPTION OF THE PREFERRED EMBODIMENT

The construction of this invention will be described in detail on the basis of an embodiment in the following by referring to the attached drawings.

Figure 1:
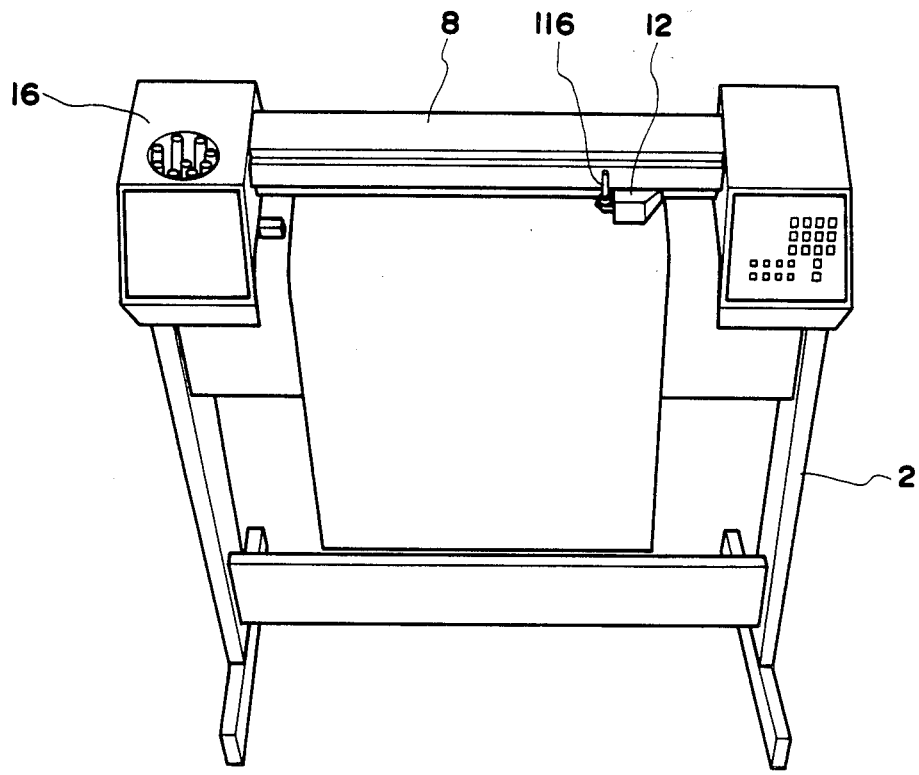
FIG. 1 is a perspective view of an automatic drafting machine.
Figure 2:
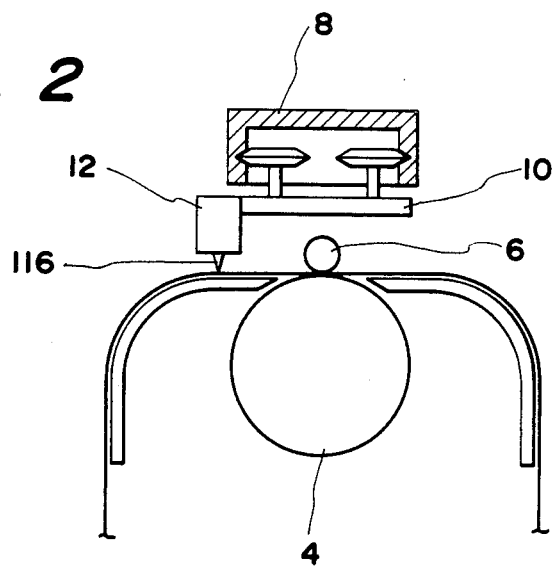
FIG. 2 is an explanatory side view of the automatic drafting machine.
Figure 3:
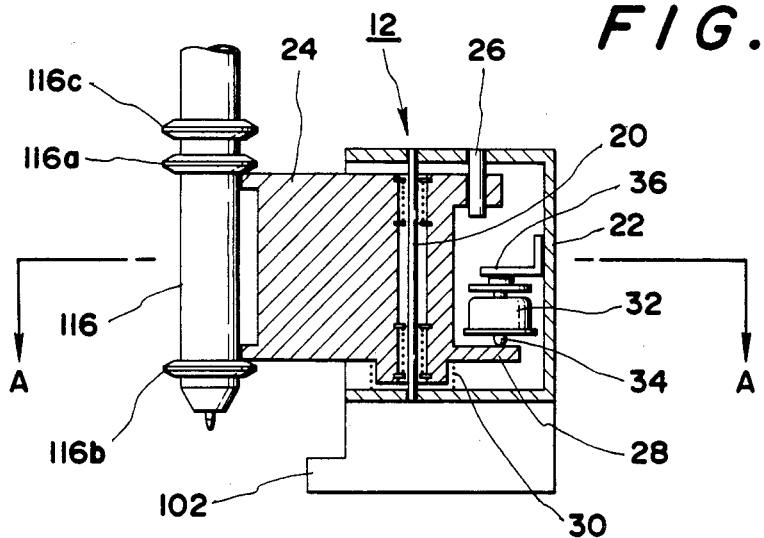
FIG. 3 is a cross sectional view of a drawing head.
Figure 4:
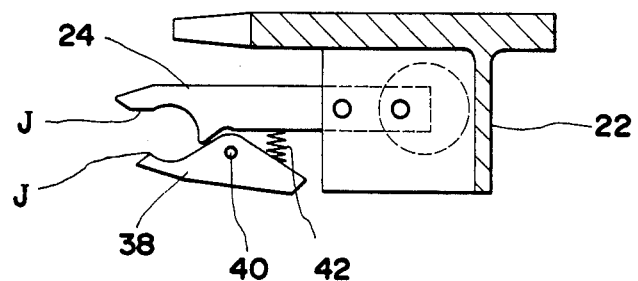
FIG. 4 is a plan view of a writing implement holder in the drawing head.
Figure 5:
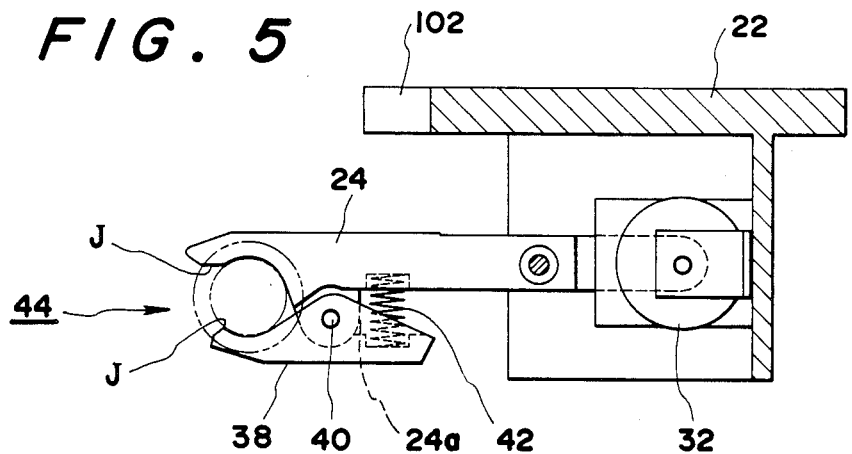
FIG. 5 is a cross sectional view taken along the line A—A of FIG. 3.
Figure 8:
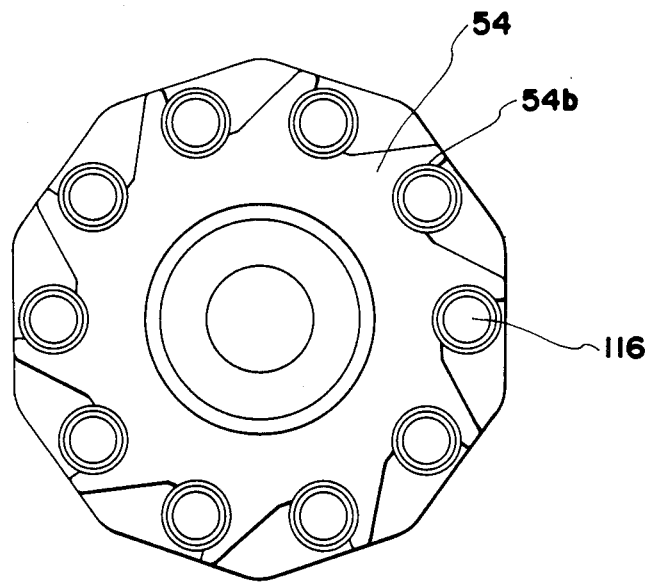
FIG. 8 is a plan view of the stocker.
Figure 19:
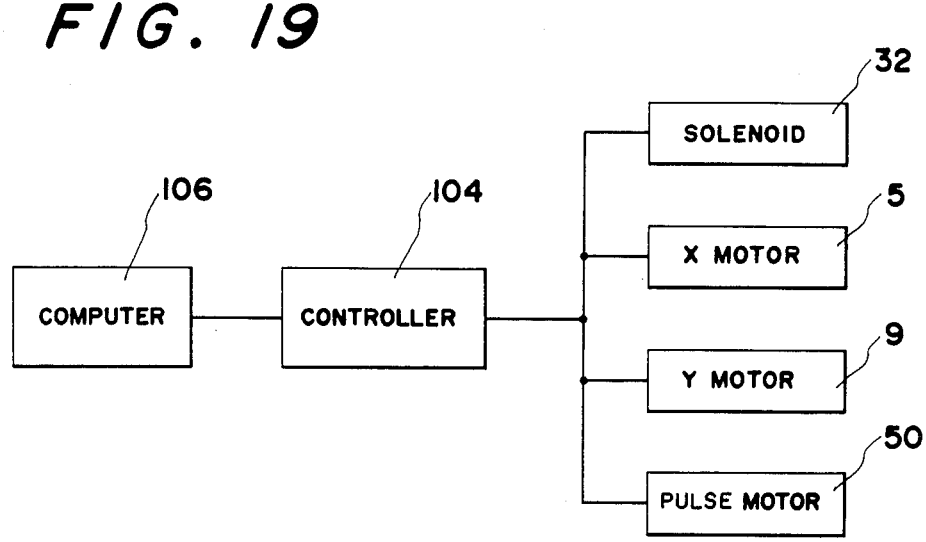
FIG. 19 is a block diagram of a control system for the apparatus.
Figure 20:
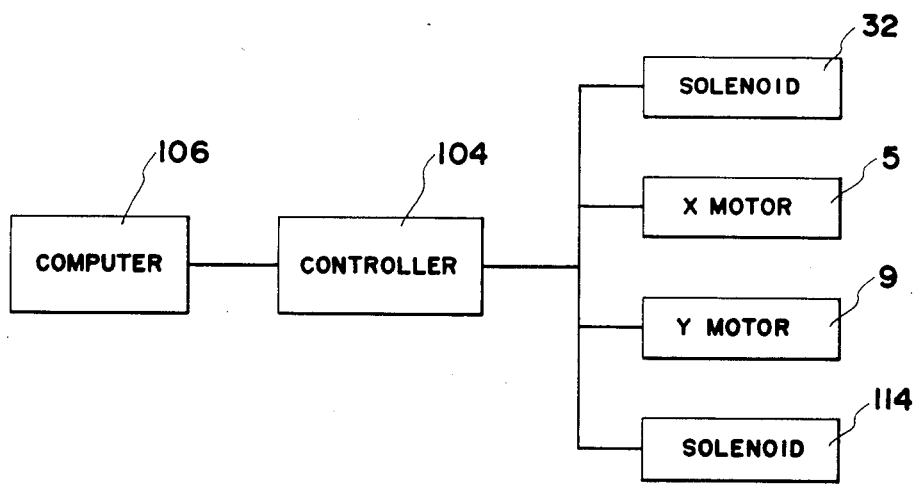
FIG. 20 is a block diagram of a modified control system for the apparatus.

In FIG. 1 and FIG. 2, reference numeral 2 denotes a machine body, and numeral 4 denotes a drive roller, which is connected to an X motor 5, shown schematically in FIGS. 19 and 20. Numeral 6 denotes a pressure roller, and 8 denotes a Y rail, and a Y cursor 10 connected to a Y motor 9 (FIGS. 19 and 20) is shiftably mounted on the Y rail 8. A drawing head 12 is fixed to the Y cursor 10, and a writing implement holder consisting of a stationary arm and a rotary arm to hold the writing implement is mounted on the drawing head 12. Numeral 16 denotes a writing implement magazine provided on the machine body 2, and a magazine to be described hereinafter is stored in the magazine unit, and a plurality of writing implement holders are provided in the magazine.

Next referring to FIGS. 3 through 6, the interval structure of the drawing head 12 will be explained.

Figure 13A:
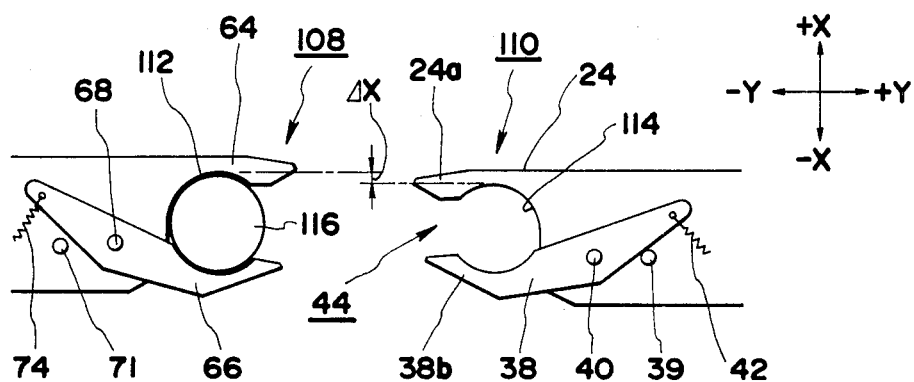
FIGS. 13a–13c are explanatory views for showing the operation when the drawing head moves to pick up the writing implement at the magazine.
Figure 13B:
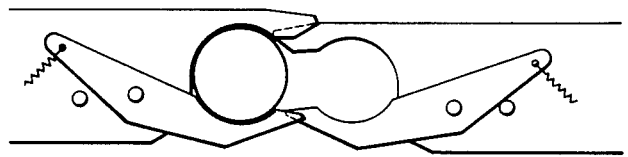
Figure 13C:
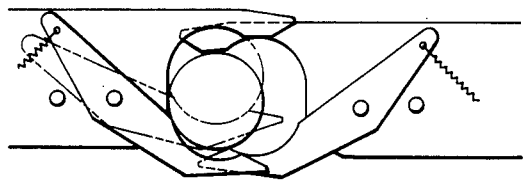

Numeral 20 denotes a support shaft suspended on a head base plate 22, and the support shaft is liftably inserted into a hole running through a body portion of a stationary arm 24 by means of a stroke ball bearing. The stationary arm 24 is engaged with a detent pin 26, and thus, the rotation of the support shaft 20 is blocked. A projecting member 28 on the stationary arm 24 is in elastic contact with an output shaft 34 of a solenoid 32 under the resilient force of a coil spring 30. Numeral 36 denotes a stopper for the output shaft 34, which is fixed to the base plate 22. Numeral 38 denotes a rotary arm having writing implement holding members 38a and 38b projecting from upper and lower portions of the rotary arm. The arm 38 is rotatably journalled on a projection 24c of the stationary arm 24 by a pin 40. Writing implement holding members 24a and 24b project from the upper and lower ends of the stationary arm 24. The rotary arm 38 is urged in a clockwise direction in FIG. 5 by a coil spring 42. The rotation of the rotary arm 38 in the clockwise direction is controlled by a pin 39 (refer to FIG. 13), and even if a writing implement is not positioned between the arms 24 and 38, an open space 44 is formed between the arms 24 and 38. The writing implement holding members 24a and 24b and 38a and 38b project in a direction parallel to the Y rail 8, and the open space 44 formed by the writing implement holding members 24a and 24b and 38a and 38b is opposed to the magazine to be described hereinafter.

Each of the writing implement holding members 24a and 24B and 38a and 38b is formed with a jaw portion J projecting into the inside of the open space (refer to FIG. 5) and a concave portion d formed as shown in FIG. 6.

Next, the magazine will be described primarily by referring to FIG. 7

Figure 9:
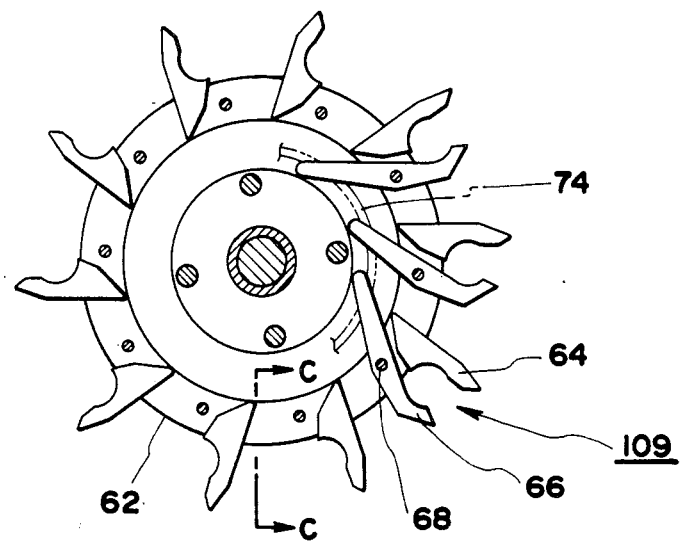
FIG. 9 is a cross sectional view of the magazine.

Numeral 50 denotes a pulse motor fixed to a base 51 of the writing implement magazine unit 16, and a rotary shaft 52 is fixed to an output shaft of the pulse motor 50. Numeral 54 denotes a magazine having a tubular portion 54a fitted onto the rotary shaft 53, and a disc 56 fixed to the lower surface by means of screws 58. A head portion of the screw 58 is fitted to a hole bored in a flange portion of the rotary shaft 52, and thus, the magazine 54 is connected to the flange portion of the rotary shaft 52 to interlock with the rotary shaft 52 in the rotating direction. A plurality of writing implement holding portions 54b project radially on the flange portion of the magazine 54 in a plurality of notched portions. Numeral 62 denotes a ring, and a plurality of stationary arms 64 project radially from the ring 62, and they are disposed in opposition to corresponding rotary arms 66 pivotally mounted on shafts 68 and ring 62. Each shaft 68 is inserted into a hole bored in the ring 62 and a hole bored in a middle portion of the rotary arm 66. On the upper portion of the shaft 68 is fitted a tubular portion of a boss 70 extending downwardly from the magazine 54, and a small diameter portion of a lower end of the shaft 68 is fitted in a concave recess 72 of semicircular shape formed on the outer periphery of the disc 56. A step portion of the shaft 68 abuts on the horizontal surface of the outer peripheral portion of the disc 56. The ring 62 is thus fixed to the disc 56 for rotating therewith by the shafts 68. The rear end of each rotary arm 66 is connected to an elastic member 74 consisting of a ring like coil spring, and each rotary arm 66 is urged around the shaft 68 in a counterclockwise direction in FIG. 9 by the elastic member 74. The amount of rotation of the rotary arm 66 is limited by a pin 71 (refer to FIG. 13). The writing implement holding members 24a and 24b and 38a and 38b are at a different vertical level than the arms 64 and 66 so that the arms 24 and 38 can be mutually superposed, namely, they can be crossed with each other.

Figure 10:
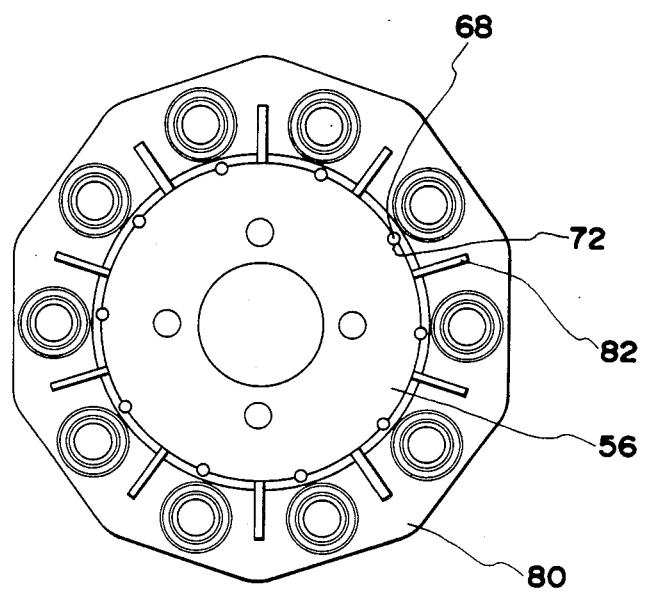
FIG. 10 is a cross section taken along the line B—B in FIG. 7.
Figure 11:
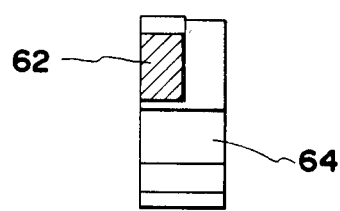
FIG. 11 is a cross section taken along a line C—C of FIG. 9.
Figure 12:
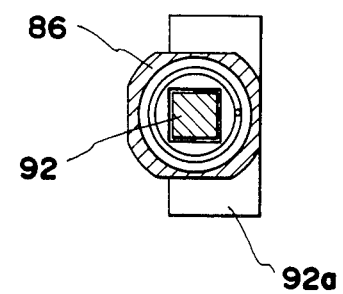
FIG. 12 is a cross section taken along a line D—D of FIG. 7.

The arms 64 and 66 are formed with a flange portion and a concave portion similar to the arms 24 and 38. In FIGS. 7, 10 and 11, numeral 80 denotes a disc connected to the disc 56 by a connecting plate 82, and cap mounting devices 84 are mounted on the disc. In the drawings, numeral 86 denotes a cylinder, 88 denotes a resin holder, 90 denotes a rubber writing implement cap, and 92 denotes a lifting lever connected to the holder 88, and a bottom plate portion 92a is formed on the lower end of the lifting lever 92. Numeral 94 denotes a coil spring, 96 denotes a rotary member rotatably journalled on the base 51, and an arm 98 and a fork like are 100 are fixed to the rotary member 96. A projection 102 is formed on a bottom portion of the head base plate 22 corresponding to the arm 98. In. FIG. 19, numeral 104 denotes a controller which is constructed to control the drive of the X motor 5, Y motor 9, pulse motor 50 and solenoid 32 under the instruction of a computer 106. The motor 50 can be a servo motor or a combined servo motor and an index mechanism instead of pulse motor.

Next, the operation of this embodiment will be described.

First a description will be given of the case where the drawing head 12 moves to pick up a writing implement 116 from the magazine.

Figure 14A:
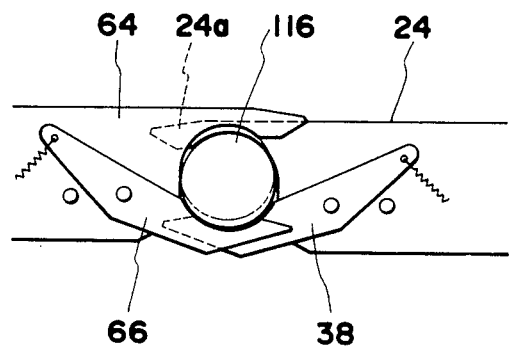
FIGS. 14a and 14b are an explanatory views for showing a continuation of the operation shown in FIGS. 13a–13c.
Figure 14B:
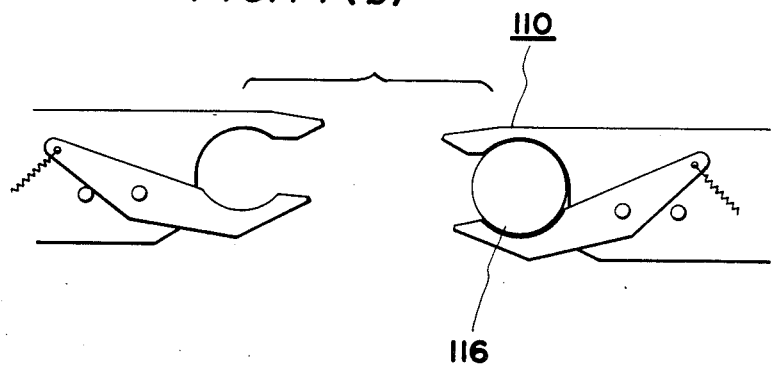

The controller 104 drives the pulse motor 50 in accordance with a writing implement selecting instruction from the computer 106, and a predetermined writing implement holder 108 (refer to FIG. 13) holding a writing implement is brought into position opposite a writing implement holder 110 of the drawing head 12. The pulse motor 50 is locked by a locking mechanism (not shown) after it is stopped. At this time, the writing implement holding end 112 of the stationary arm 64 is set at an outside (position shifted in +X direction) of the open space 44 at a predetermined interval in the direction of the X-coordinate axis relative to the writing implement holding side 114 of the stationary arm 24 of the drawing head 12. Next, the Y motor 9 is operated by the controller 104, and the writing implement holder 110 is shifted (refer to FIG. 13a) toward the writing implement holder 108 in a straight line direction (−Y direction). When the tip portions 24a and 24b of the stationary arm 24 abut the writing implement 116 (FIG. 13b) and arm 24 is shifted further in the Y-direction, the writing implement 116 is separated (refer to FIG. 13c) from the writing implement holding portion of the stationary arm 62 by the shifting force of the stationary arm 24 moving the writing instrument against arm 66 and pivoting it against the elastic force of the elastic member 74. When the stationary arm 24 is shifted further in the −Y direction, and the writing implement 116 is gripped between writing implement holding portion of the stationary arm 24 and the writing implement holding portion of the rotary arm 38, and the shifting of the drawing head in the −Y direction is stopped (FIG. 14a). At this time, the writing implement 116 is shifted by a predetermined interval X outwardly of the writing implement holding portion of the stationary arm 64. Namely, the writing implement 116 is fitted and retained between the stationary arm 24 and the rotary arm 38 by a predetermined elastic force, but the writing implement 116 is retained on only one side of the rotary arm 66 between the stationary arm 64 and the rotary arm 66. At this time, the lower surface of the flange portion 116a of the writing implement 116 abuts the upper surfaces of the writing implement holding members 24a and 38a (refer to FIG. 3), and the upper surface of the flange portion 116a abuts the lower surfaces of the writing implement holding members 54a and 54b. Next, when the stationary arm 24 is shifted in the +Y direction by the shifting of the drawing head 12, since the writing implement holding force between the stationary arm 24 and the rotary arm 38 is larger than the holding force between the stationary arm 64 and the rotary arm 66, the writing implement 116 is gripped between the writing implement holding portions of the stationary arm 24 and the rotary arm 38 and is shifted in the +Y direction to the writing implement holder 110 of the drawing head from the magazine 54 (refer to FIG. 14b). When the drawing head 12 is shifted to the vicinity of the magazine 54, before the stationary arm 24 reaches the writing implement 116, the projection 102 collides with the arm 98, and the arm 100 is thereby swiveled in the direction in FIG. 7, and the lifted lever 92 is forced to move downward. The writing implement cap 90 is separated a predetermined distance from the tip of the writing implement 116 by the downward movement of lever 92.

Next, the operation of shifting the writing implement 116 from the writing implement holder 114 of the drawing head 12 to the writing implement holder of the magazine 54 will be described.

Figure 16A:
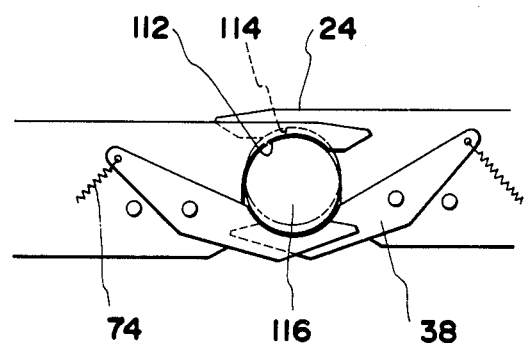
FIGS. 16a and 16b are explanatory views for showing a continuation of the operation of FIGS. 15a–15c.

The controller 104 drives the pulse motor 50 in accordance with a writing implement selecting instruction from the computer 106, and a predetermined empty writing implement holder 108 is brought into position opposed on the writing implement holder 110 of the drawing head 12. The pulse motor 50 is locked by a locking mechanism after it is stopped. At this time, the writing implement holding end 114 of the stationary arm 24 is set at a position shifted to the outside of the open space 109 of the writing implement holder 108 by a predetermined interval ΔX in the direction of +X on the coordinate axis relative to the writing implement holding end 112 of the stationary arm 64 in the magazine 54 (See FIG. 15a). Next, the Y motor 9 is operated by the controller 104, and the writing implement holder 110 is shifted toward the writing implement holder 108 in a straight line direction (refer to FIG. 15a). The writing implement 116 abuts on the tip portions 64a and of the stationary arm 64 (refer to FIG. 15b), and when the stationary arm 24 is further shifted in the −Y direction, the writing implement 116 is separated from the writing implement holding portion of the stationary arm 24 by the shifting force of the stationary arm 24 against the arm hole and in turn against the elastic force of the spring 42 (refer to FIG. 15c). When the stationary arm 24 is further shifted in the −Y direction, the writing implement 116 is tightly gripped between the writing implement holding portion of the stationary arm 64 and the writing implement holding portion of the rotary arm 66 by the elastic force of the elastic member 74 (refer to FIG. 16a), the shifting of the stationary arm 24 is stopped. In this condition, an outer peripheral groove formed by the flange portions 116a and 116c of the writing implement 116 fits over the edge portion of the writing implement holding portion 54b of the magazine 54. At this time, the writing implement 116 is separated by a predetermined interval from the writing implement holding portion of the stationary arm 24 because the arm 24 is shifted a distance ΔX outside of the writing implement holder 108, and the writing implement 116 is retained on one side only by the rotary arm 38 between the stationary arm 24 and the rotary arm 38. Next, when the stationary arm 24 is shifted in the +Y direction, since the writing implement holding force between the stationary arm 64 and the rotary arm 66 is larger than the writing implement holding force between the stationary arm 24 and the rotary arm 38 the writing implement 116 is gripped and retained between, the writing implement holding portions of the rotary arm 64 and the rotary arm 66, and the stationary arm 24 and the rotary arm 38 are separated from the magazine 54 in the foregoing condition (refer to FIG. 16c).

Figure 17:
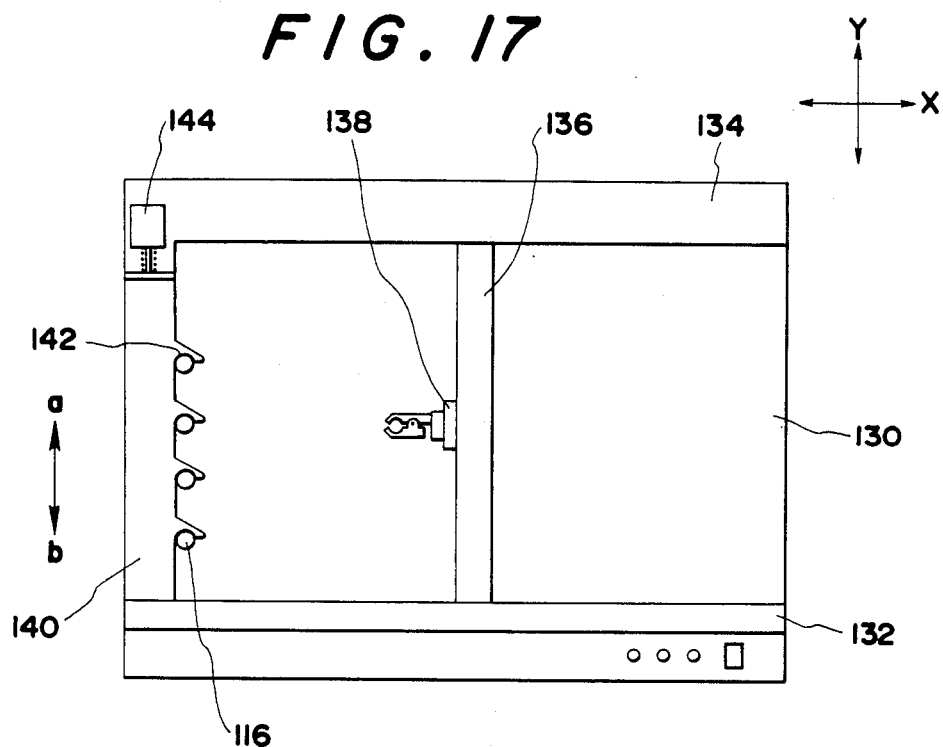
FIG. 17 is a plan view of another embodiment.
Figure 18:
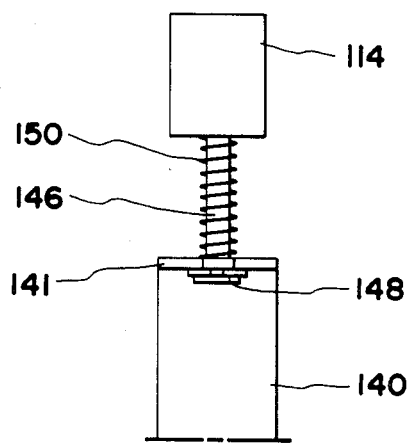
FIG. 18 is an enlarged plan view of part of FIG. 17.

The foregoing embodiment describes an automatic drafting machine driven by a pinch roller mechanism consisting of the drive roller and the pressure roller 6, as shown in FIG. 17. However, this invention can be applied to the automatic drafting machine in which the Y rail 136 is shiftably mounted on the X rails 132, 134 at both side portions of the paper mounting table 130 in an interlocking mode with the X motor, and the Y motor is connected to the Y rail 136, and the drawing head 138 is mounted on the Y rail. In this case, a rotary type magazine as shown In FIG. 7 can be used, or a long straight magazine 140 as shown in FIG. 17 can be used. The magazine 140 has a plurality of writing implement holding portions 142, and is provided with a plurality of writing implement holders consisting of stationary arms and rotary arms identical with those of the magazine shown in FIG. 7. An output shaft 146 of a solenoid 144 mounted on the machine body is connected to a plate portion 141 of one end of the magazine 140. Numeral 150 denotes a return spring which has a strong elastic force. The magazine 140 is shiftably guided by a guide on the machine body in the straight line direction along the Y rail 136.

Figure 16B:
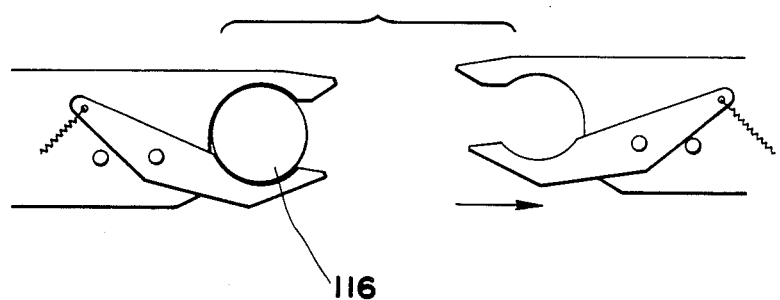

In the foregoing construction, the drawing head 138 is shifted to a position where it is opposed to the writing implement holding portion 142 of the magazine 140 under the control of the writing implement selecting instruction. Next, when the solenoid 144 is operated and the drawing head 138 moves to pick up the writing implement, the magazine 140 is shifted in the direction of the arrow a, and the shifting in the Y direction of the position relationship of the stationary arm on the magazine 140 and the stationary arm on the drawing head 138 is as shown in FIG. 13. By this construction, the drawing head 138 is merely shifted linearly and reciprocally in the X direction to allow the mounting of the writing implement from the magazine 140 on the drawing head 138. When the writing implement of the drawing head 138 is to be returned to the magazine 140, the solenoid 144 is deenergized, and magazine 140 is shifted in the direction of arrow b by the elastic force of the spring 150, and the positional relationship of the stationary arm on the magazine 140 and the stationary arm on the drawing head 138 becomes as shown in FIG. 15. Namely, the writing implement holding end 112 of the stationary arm on the magazine 140 is shifted a predetermined interval in the right angle direction to the exchanging and shifting direction of the implement on the drawing head relative to the writing implement holding end 114 of the stationary arm 24 on the drawing head 138 and in the inside direction of the writing implement holding open space 44 of the drawing head 138. In this condition, when the drawing head 138 merely linearly reciprocates in the X direction, the writing implement 116 can be stored in the magazine 140 as shown in FIG. 15 and FIG. 16.

The solenoid 144 and the pulse motor 50 to be controlled by the computer constitute the position shifting means for shifting the position of the magazine relative to the stationary arm of the drawing head. The position shifting operation of the magazine relative to the drawing head may be carried out by shifting the drawing head 138 relative to the magazine by the program for the computer. Also, the pulse motor 50 and the magazine 54 constitute the writing implement holder selecting means, and a mechanism for driving the magazine 140 and the drawing head 138 in the second embodiment along the Y rail 136 constitutes the writing implement holder selecting means.

What is claimed is:

1. A method of transferring writing instruments for an automatic drawing machine between a writing instrument storage magazine and a writing head which are relatively movable toward and away from each other, said method comprising:

providing a plurality of writing instrument holding means on said magazine, each having a fixed holding arm and a pivotally movable holding arm pivotable toward and away from said fixed holding arm and spring loaded toward said fixed holding arm for gripping a writing instrument therebetween with the axis of the writing instrument transverse to the line of movement of said writing head, said fixed holding arm having a pointed projection on the outer end thereof extending toward said movable holding arm;

a further writing instrument holding means on said writing head having a further fixed holding arm and a further pivotally movable holding arm pivotable toward and away from said further fixed holding arm and spring loaded toward said further fixed holding arm for gripping a writing instrument therebetween with the axis of the writing instrument extending in the same direction as the axis of the writing instrument in the instrument holding means on said magazine, said further fixed holding arm having a pointed projection on the outer end thereof extending toward said further movable holding arm, said fixed holding arm and said further fixed holding arm being generally opposed to each other and said movable holding arm and said further movable holding arm being generally opposed to each other when said writing head is at the end of its movement toward said magazine, and said opposed holding arms and further holding arms being offset relative to each other in the direction of the axis of the writing instrument for permitting the further holding arms to move past each other when said writing head is moving toward said magazine;

bringing a desired one of said writing instrument holding means into a position opposed to said writing head when said writing head is at the end of its movement toward said magazine;

moving the writing head and magazine relatively toward each other with a writing instrument in the further holding arms to transfer the writing instrument to the magazine while moving said magazine and writing head relative to each other in a direction orthogonal to the plane defined by the axis of the writing instrument and the line of relative movement of the writing head and the magazine for moving the further fixed holding arm so that it is slightly offset from said fixed holding arm in a direction away from said movable holding arm, and moving the holding arms and further holding arms past each other in the direction of the relative movement of the magazine and writing head toward each other for causing the projection on said fixed holding arm to move the writing instrument toward and against said spring loaded further movable holding arm and to cause the holding arms to grip the writing instrument, and then moving the writing head and magazine relatively away from each other for causing the writing instrument to remain gripped in the magazine; and moving the writing head and magazine relatively toward each other with a writing instrument in the holding arms to transfer the writing instrument to the writing head while moving said magazine and writing head relative to each other in a direction orthogonal to the plane defined by the axis of the writing instrument and the line of relative movement of the writing head and the magazine for moving the further fixed holding arm so that it is slightly offset from said fixed holding arm in a direction toward said movable holding arm, and moving the holding arms and further holding arms past each other in the direction of the relative movement of the magazine and writing head toward each other for causing the projection on said further fixed holding arm to move the writing instrument toward and against said spring loaded movable holding arm and to cause the further holding arms to grip the writing instrument, and then moving the writing head and magazine relatively away from each other for causing the writing instrument to remain gripped in the writing head.

2. An apparatus for transferring writing instruments for an automatic drawing machine between a writing instrument storage magazine and a writing head which are relatively movable toward and away from each other, said apparatus comprising:

a plurality of writing instrument holding means on said magazine each having a fixed holding arm and a pivotally movable holding arm pivotable toward and away from said fixed holding arm and spring loaded toward said fixed holding arm for gripping a writing instrument therebetween with the axis of the writing instrument transverse to the line of movement of said writing head, said fixed holding arm having a pointed projection on the outer end thereof extending toward said movable holding arm;

means for bringing a desired one of said writing instrument holding means into a position opposed to said writing head when said writing head is at the end of its movement toward said magazine;

a further writing instrument holding means on said writing head having a further fixed holding arm and a further pivotally movable holding arm pivotable toward and away from said further fixed holding arm and spring loaded toward said further fixed holding arm for gripping a writing instrument therebetween with the axis of the writing instrument extending in the same direction as the axis of the writing instrument in the instrument holding means on said magazine, said further fixed holding arm having a pointed projection on the outer end thereof extending toward said further movable holding arm, said fixed holding arm and said further fixed holding arm being generally opposed to each other and said movable holding arm and said further movable holding arm being generally opposed to each other when said writing head is at the end of its movement toward said magazine, and said opposed holding arms and further holding arms being offset relative to each other in the direction of the axis of the writing instrument for permitting the further holding arms to move past each other when said writing head is moving toward said magazine; and means for moving said magazine and said writing head relative to each other in a direction orthogonal to the plane defined by the axis of the writing instrument and the line of movement of said writing head for, when said writing head is moved toward said magazine with a writing instrument therein to transfer the writing instrument to the magazine, moving the further fixed holding arm so that it is slightly offset from said fixed holding arm in a direction away from said movable holding arm and for, when said writing head is moved toward said magazine while it is empty to pick up a writing instrument from said magazine, moving the further fixed holding arm so that it is slightly offset from said fixed holding arm in a direction toward said movable holding arm.

* * * * *